United States Patent

Tholander et al.

[11] Patent Number: 5,908,554
[45] Date of Patent: Jun. 1, 1999

[54] METHOD AND PLANT FOR THE PURIFICATION OF WASTE WATER BY THE ACTIVATED SLUDGE METHOD

[75] Inventors: Bent Tholander, Lyngby; Marinus Nielsen, Virum, both of Denmark

[73] Assignee: Krüger A/S, Søborg, Denmark

[21] Appl. No.: 08/765,938

[22] PCT Filed: Jul. 14, 1995

[86] PCT No.: PCT/DK95/00309

§ 371 Date: Mar. 12, 1997

§ 102(e) Date: Mar. 12, 1997

[87] PCT Pub. No.: WO96/02468

PCT Pub. Date: Feb. 1, 1996

[30] Foreign Application Priority Data

Jul. 14, 1994 [DK] Denmark ................ 0846/94

[51] Int. Cl.⁶ .................................................. C02F 3/30
[52] U.S. Cl. ................ 210/605; 210/614; 210/624; 210/195.3; 210/253; 210/903; 210/906
[58] Field of Search .................. 210/605, 607, 210/624, 630, 195.1, 195.3, 253, 202, 610, 903, 906, 614

[56] References Cited

U.S. PATENT DOCUMENTS

| | | | |
|---|---|---|---|
| 3,977,965 | 8/1976 | Tholander et al. | 210/903 |
| 4,655,925 | 4/1987 | Tabata et al. | 210/605 |
| 4,663,044 | 5/1987 | Goronszy | 210/624 |
| 4,948,510 | 8/1990 | Todd et al. | 210/624 |
| 5,137,636 | 8/1992 | Bundgaard | 210/605 |
| 5,228,996 | 7/1993 | Lansdell | 210/605 |
| 5,342,523 | 8/1994 | Kuwashima | 210/605 |
| 5,354,471 | 10/1994 | Timpany et al. | 210/253 |
| 5,536,407 | 7/1996 | Petersen | 210/607 |
| 5,605,629 | 2/1997 | Rogalla | 210/605 |
| 5,624,563 | 4/1997 | Hawkins | 210/624 |

FOREIGN PATENT DOCUMENTS

| | | |
|---|---|---|
| 149767 | 2/1987 | Denmark . |
| 0071960 | 2/1983 | European Pat. Off. . |
| 2635381 | 2/1978 | Germany . |
| 3427310 | 7/1992 | Germany . |
| 58-36639 | 8/1983 | Japan . |
| 58-199098 | 11/1983 | Japan . |
| 62-244496 | 10/1987 | Japan . |

OTHER PUBLICATIONS

Abstract of Japanese 63–166499.

*Primary Examiner*—Christopher Upton
*Attorney, Agent, or Firm*—Watson Cole Grindle Watson, P.L.L.C.

[57] ABSTRACT

A method and plant for the purification of polluted water by the activated sludge method is provided in that a mixture of polluted water and recycled sludge is subjected to biological treatments in at least two treatment zones, and maintaining for a period such conditions in one of the treatment zones that a sludge precipitation occurs therein, supplying in a subsequent period the mixture of polluted water and recycled sludge directly or indirectly to the zone which, during the preceding period, served as a sludge precipitation zone prior to further treatment thereof in one or more treatment zones, and passing the treated water to a permanent clarification zone and separating it into a water fraction and a sludge fraction, at least a part of the sludge fraction being recycled and mixed with polluted water.

9 Claims, 7 Drawing Sheets

PERIOD A

PERIOD B

AERATION  MIXTURE, ANOXIC  SLUDGE PRECIPITATION

METHOD AND PLANT FOR THE PURIFICATION OF WASTE WATER BY THE ACTIVATED SLUDGE METHOD

BACKGROUND OF THE INVENTION

The present invention relates to a method for the purification of polluted water, such as waste water, by the activated sludge method, whereby the polluted water is successively subjected to biological treatments in at least two treatment zones, and whereby the water thus treated is passed to a permanent clarification zone and separated into a water fraction and a sludge fraction, at least a portion of the latter being recycled and mixed with untreated water.

A known method of the above-mentioned type and which is described in GB 1 404 565, is used for the removal of nitrogen from waste water. In this known method, two biological treatment zones are used, and a mixture of untreated waste water and recycled sludge is in one period passed to the one treatment zone during which period stirring is carried out while simultaneously maintaining anoxic conditions, and subsequently to the second treatment zone where, during the same period, aeration is carried out while maintaining aerobic conditions.

During a subsequent period the mixture of waste water and recycled sludge is passed to the second treatment zone where anoxic conditions are now maintained, and then to the first treatment zone where aerobic conditions are maintained during the same period.

During the aerobic treatment of the waste water in the presence of the micro-organisms contained in the sludge, $NH_3$-nitrogen is converted to nitrate (nitrification). When the nitrate thus formed is subsequently subjected to anoxic conditions in the presence of micro-organisms, nitrate is converted into free nitrogen (denitrification), the nitrogen thus formed being removed in gaseous form.

According to DK-B-149 767, the above-described known method can be combined with an initial anaerobic treatment of the mixture of untreated waste water and recycled sludge. By this known method, both phosphorus and nitrogen may be removed from the waste water.

In a further known method of the kind described in the introductory part—the so-called Tricycle-method—a mixture of untreated waste water and recycled sludge is, following initial anaerobic treatment, subjected to successive treatments in three different treatment zones before the waste water thus treated is passed to the clarification zone.

In a first cycle, the anaerobically treated mixture of waste water and sludge is subjected to an anoxic treatment in the first of the three treatment zones and then to successive aerobic treatments in the second and the third treatment zones.

In a subsequent cycle, the anaerobically treated mixture of waste water and sludge is passed to the third treatment zone and is therein subjected to an anoxic treatment before it is passed to the first and subsequently to the second treatment zone in which it is subjected to successive aerobic treatments.

In a third cycle, the anaerobically treated mixture of waste water and sludge is passed to the second treatment zone in which it is treated anoxically and then to the third and finally to the first treatment zone in which aerobic conditions are maintained.

In a further known method—the so-called Triple-channel method—three treatment zones are used, and in a first phase the waste water is treated successively in the three zones of which the third act as a clarification zone. In a subsequent phase the untreated waste water is supplied to the third treatment zone and passed through the second treatment zone to the first zone which acts as a clarification zone in this fase. In the known method no permanent clarification zone is used and the precipitated sludge is not recycled from the clarification zone.

It is well known that the efficiency of biological treatments of waste water in the presence of activated sludge increases with increasing amounts of sludge in the treatment zones. However, in order to obtain high sludge concentrations and thus large amounts of sludge in the treatment zones, the mass balance requires operation with high sludge-recycling ratios, i.e. high ratios between the amount of sludge recycled from the clarification zone and the amount of untreated waste water.

The relationship between sludge concentration in the treatment zones and the recycling ratios will appear from Table 1, which is based on the assumption that the sludge concentration in the return sludge is about 8 $kg/m^3$.

TABLE 1

| Sludge Concentration $kg/m^3$ | Recycling Ratio |
|---|---|
| 1 | 0.15 |
| 2 | 0.34 |
| 2.5 | 0.50 |
| 3 | 0.60 |
| 3.5 | 0.75 |
| 4 | 1.0 |
| 4.5 | 1.25 |
| 5 | 1.50 |
| 5.5 | 2.10 |

As will appear from Table 1, it is necessary to use a sludge recycling ratio of 1.0 in order to obtain a sludge concentration of about 4 $kg/m^3$. This involves partly a high load on the clarification zone and partly substantial costs for the construction and operation of the sludge recycling equipment.

The invention is based on the discovery that high sludge concentrations may be obtained in the biological treatment zones without using high recycling ratios and while avoiding the problems associated therewith by maintaining for a period such conditions in one of the treatment zones that a sludge preciptiation occurs therein and by supplying, in a subsequent period, the mixture of polluted water and recycled sludge directly or indirectly to the zone which, during the preceding period, served as a sludge precipitation zone prior to further treatment thereof in one or more treatment zones.

By effecting the water purification in the manner described above, comparatively large amounts of sludge will be concentrated in one of the treatment zones, and instead of passing this sludge to the permanent clarification zone which an actual separation of sludge is effected and from which the separated sludge is recycled and admixed with untreated water, this treatment zone having a high sludge content is used as a biological treatment zone for incoming polluted water in a subsequent period. Hereby a highly increased ratio of sludge to polluted water and thus an increased purification effect is obtained. In other words, sludge is withheld and the withheld sludge is "moved" to the upstream side of the witholding site rather than being recycled in a conventional manner.

SUMMARY OF THE INVENTION

The method according to the invention allows for an increased sludge concentration in both the treatment zone which, during a preceding period, served as a sludge precipitation zone and the treatment zone(s) through which the mixture of polluted water and sludge passes on its way to the permanent clarification zone. As mentioned, the increased ratio of sludge to polluted water in the treatment zones results in an increased purification effect and this is achieved simultaneously with a substantial reduction of the recycling ratio.

When effecting a biological purification by the method of the invention the water is deprived from organic matter simultaneously with the conversion of ammonia into nitrate (nitrification). In this context the term ammonia also comprises ammonium and other convertible Kjeldahl-nitrogen. Surprisingly it has been found that the removal of organic matter may be controlled in such a manner that when the aerobic phase is discontinued as a function of completed ammonia conversion the amount of easily available carbon accumulated in the sludge is sufficient to cause a denitrification during the subsequent sludge precipitation period which is of the same magnitude as the denitrification which takes place during a normal anoxic treatment, wherein a mixture of polluted water and sludge is continuously stirred. This is probably due to the fact that the flocs which constitute the sludge have bonded organic matter prior to the precipitation and that nitrate has diffused into the interior of the sludge flocs where anoxic conditions prevail, and that for a long period following the precipitation, a considerable renewal of the interphases between sludge flocs and water has begun to occur caused by the gravitation forces of the sinking sludge and the nitrogen released as a result of the denitrification.

In brief, the method according to the invention provides the same cleaning effect at a smaller reactor volume or an increased cleaning effect at the same reactor volume compared to the most closely related known methods.

Since the sludge load on the permanent clarification zone is also reduced, the capacity of the pumping station with respect to recycled sludge and the volume of the post-clarification tank may be reduced.

The invention also relates to a plant for carrying out the method described above, the plant comprising at least two treatment tanks provided with aeration or stirring means and means for alternatingly feeding a mixture of polluted water and recycled sludge to one tank and to the other tank, means for alternatingly discharging aqueous medium from the treatment tanks, a clarification tank provided with means for feeding aqueous medium from the treatment tanks, means for discharging purified water and means for discharging precipitated sludge and recycling the discharged sludge to a treatment tank.

The plant according to the invention is characterized in having means for transmittently stopping the aeration or stirring means in each treatment tank in order to bring about precipitation of sludge and means for shifting the feeding of the mixture of polluted water and sludge in such a way that the tank which during the previous period served as a sludge precipitation tank is suppled with the mixture of polluted water and sludge before the mixture is passed on to one or more treatment tanks.

The meter is suitably a meter for measuring the ammonia concentration, but it may also be an on-line meter for measuring corresponding parameters, such as the oxygen uptake rate (OUR).

Below, the invention will be explained in detail with reference to the drawing in which

DETAILED DESCRIPTION OF THE INVENTION

Figure 1:
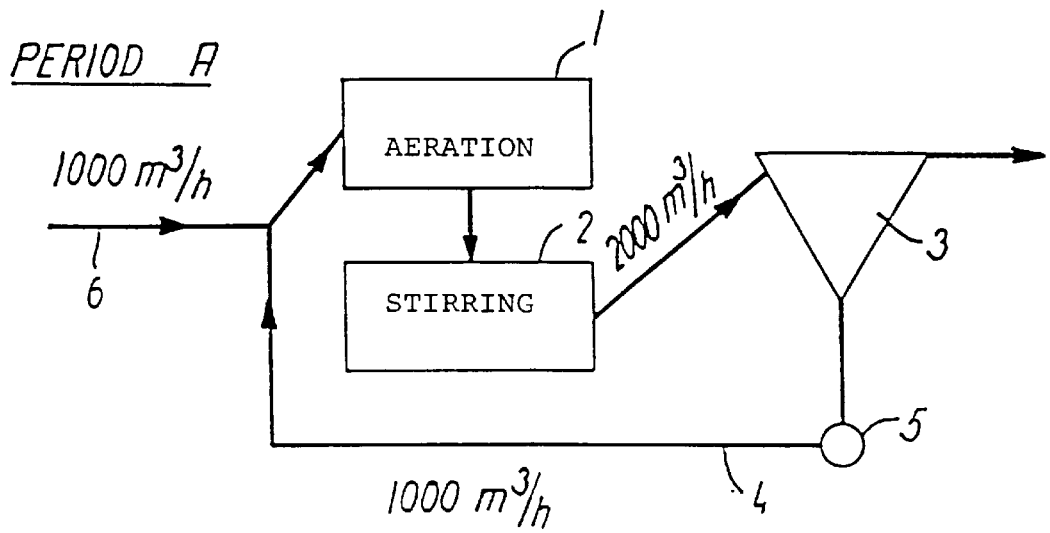
FIG. 1 schematically illustrates a waste water purification plant comprising two treatment tanks and a clarification tank operated in the conventional manner, FIG. 2 schematically illustrates a corresponding waste water purification plant operated by a method according to the invention.
Figure 1:
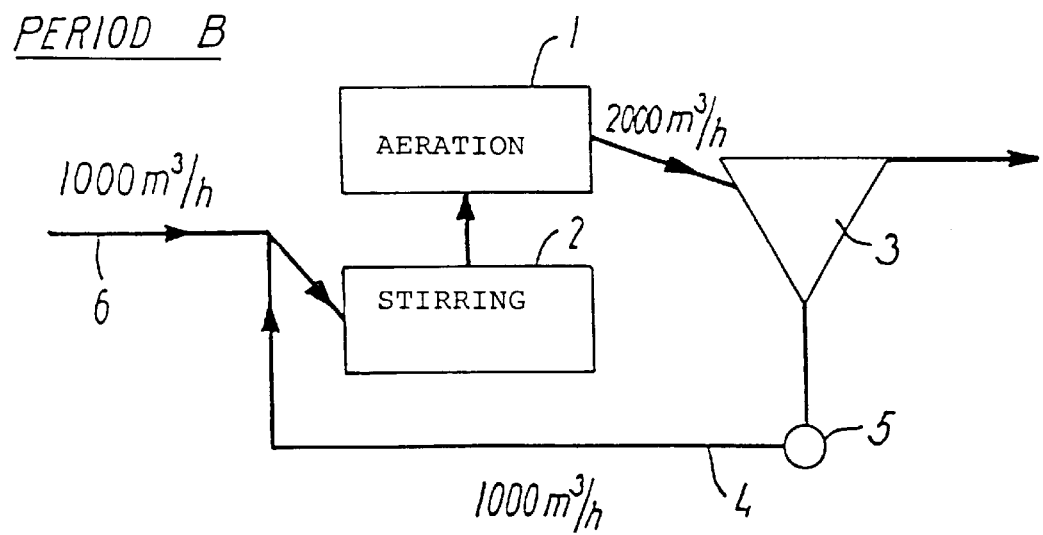

The plant shown in FIG. 1 comprises two treatment tanks 1 and 2 each having a volume of 4,000 $m^3$ and a permanent clarification tank 3, the bottom of which is in communication with an inlet conduit 6 for waste water through a recycling conduit 4 wherein a pump 5 is arranged. The tanks 1 and 2 are connected serially but the flow direction alternates as described in GB 1 404 565.

Presupposing that untreated waste water is supplied in an amount of 1000 $m^3$/h and that the sludge concentration in the tanks 1 and 2 is 4 kg/$m^3$, it follows according to the above Table 1 that sludge in an amount of 1,000 $m^3$/h has to be recycled. The load on the clarification tank is thus about 8,000 $m^3$/h.

Figure 2:
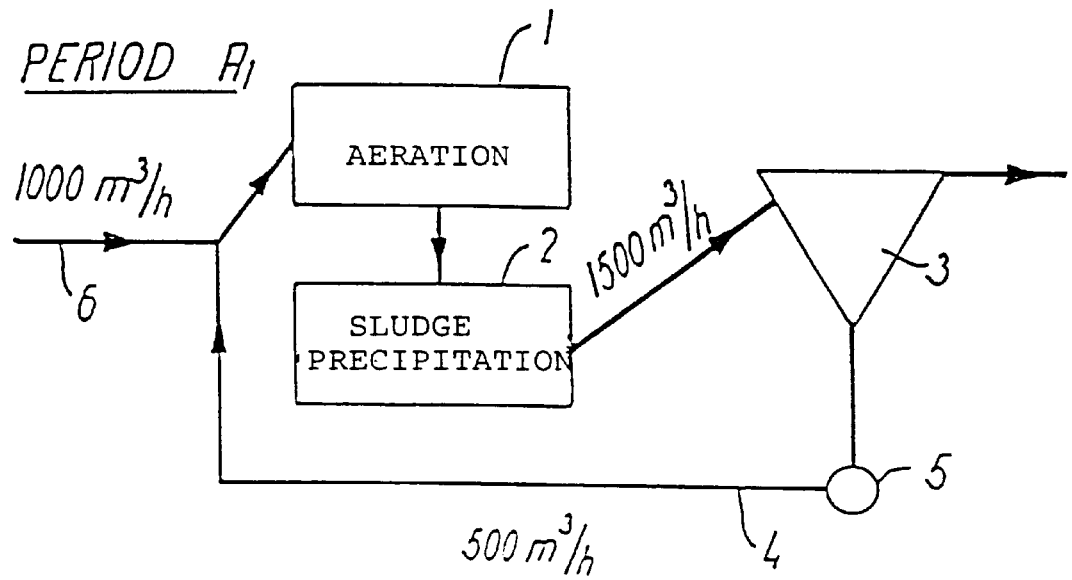
Figure 2:
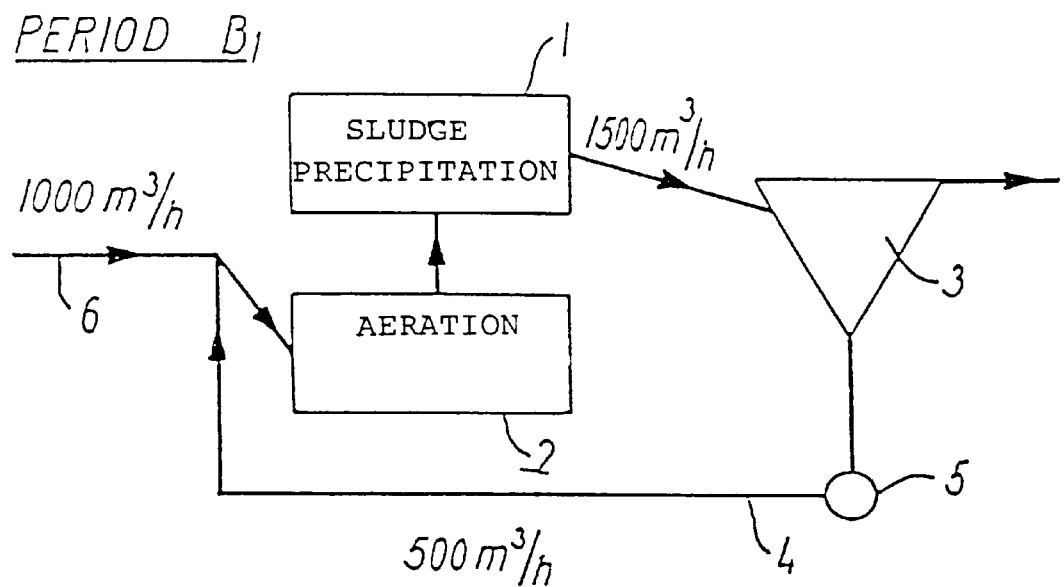

When operating the plant shown in FIG. 2 which comprises the same components as the plant according to FIG. 1 and where these components are designated with the same reference numerals as in FIG. 1, tank 1 is aerated in period $A_1$ whereas tank 2 is neither aerated nor stirred. In the subsequent period $B_1$ during which the mixture of waste water and recycled sludge is supplied to tank 2 and is aerated, the aeration of tank 1 which then serves as a precipitation tank like tank 2 during period $A_1$ is stopped.

The sludge concentration in the effluent from the last tank to the clarification tank will at first be close to the starting concentration in the aerated tank and will then drop to about 0 and subsequently again increase as the tank is filled with sludge.

Tests and calculations over periods of 90 minutes have shown that the average sludge concentration in the effluent is about 2.6 kg/$m^3$. According to Table 1 the maintenance of such sludge concentration requires that the sludge recycling is 50 percent, i.e. 500 $m^3$/h when waste water is supplied in an amount of 1,000 $m^3$/h.

Tests have shown that the sludge concentrations in the tanks 1 and 2 vary from about 4.8 to 7.0 kg/$m^3$ and is in average 5.9 kg/$m^3$.

Under these operational conditions the load on the clarification tank is about 3,900 kg/h.

As will appear from the above explanation, the use of the method according to the invention results in an increase of the sludge concentration in the tanks of from 4 to about 5.9 kg/$m^3$ and at the same time the sludge recycling ratio has been reduced from 1.0 to 0.5, and the sludge load on the clarification tank has been reduced from about 8,000 kg/h to about 3,900 kg/h.

The above-mentioned relationship between sludge amount and biological activity and thus purification effect applies not only to methods in which it is desired to remove nitrogen and optionally also phosphorus, but also to methods whose primary object it is to remove BOD. Thus, the method according to the invention may advantageously be used in connection with methods of the latter kind.

The invention has been described above in connection with the use of two treatment zones but it may also be carried out in connection with the use of three or more treatment zones.

It is particularly preferred to carry out the method according to the invention in connection with the use of four treatment zones because such an embodiment provides a particularly high degree of flexibility with regard to the choice of operational conditions, including the option of combining it with various known methods, e.g. the above-mentioned methods for the removal of nitrogen and both nitrogen and phosphorus.

The method according to the invention may e.g. be combined with the one known from GB 1 404 565 by using four treatment zones, zones 1 through 4, and by alternatingly passing a mixture of polluted water and recycled sludge to zones 1 and 3 and using zones 2 and 4 for precipitation and withholding of sludge. Hereby a combination of so-called "plug flow" and admixture is obtained.

By such use of four treatment zones it is possible to treat the same amount of sludge in three zones as in a traditional four zone plant while the fourth zone serves as a denitrification zone.

The duration of the sludge precipitation period for a given treatment zone is preferably between 30 and 180 minutes, most preferably between 45 and 120 minutes and these periods are preferably of the same duration.

It is also preferred that 10–50% of the size (volume) of the treatment zones are utilized for sludge precipitation.

Furthermore, the method described above may be used in traditional purification plants during peak loads caused by sudden showers.

In a purification plant based on the activated sludge method the clarification tank may, in case of heavy showers, receive larger amounts of sludge than it can cope with. Therefore, it may be necessary to divert suddenly occurring large amounts of waste water from the purification plant to recipients which are designed to receive purified waste water only, and this may give rise to serious environmental problems.

This disadvantage may be eliminated or reduced by the method according to the invention, viz. by maintaining during periods of unusually large inflow of polluted water such conditions in one of the treatment zones that sludge is precipitated therein and by "moving" the zone having a large content of sludge in the upstream direction in a subsequent period.

For instance, during such period neither aeration nor stirring of the polluted water will be carried out in the treatment zone in question, and this will cause that sludge is precipitated and that only water having a very limited content of sludge flows to the clarification zone. When the load of the purification plant has returned to normal the aeration/stirring in said treatment zone is resumed and the zone is then supplied with the mixture of polluted water and recycled sludge. Hereafter a normal supply of sludge to the clarification zone will take place.

Figure 3:
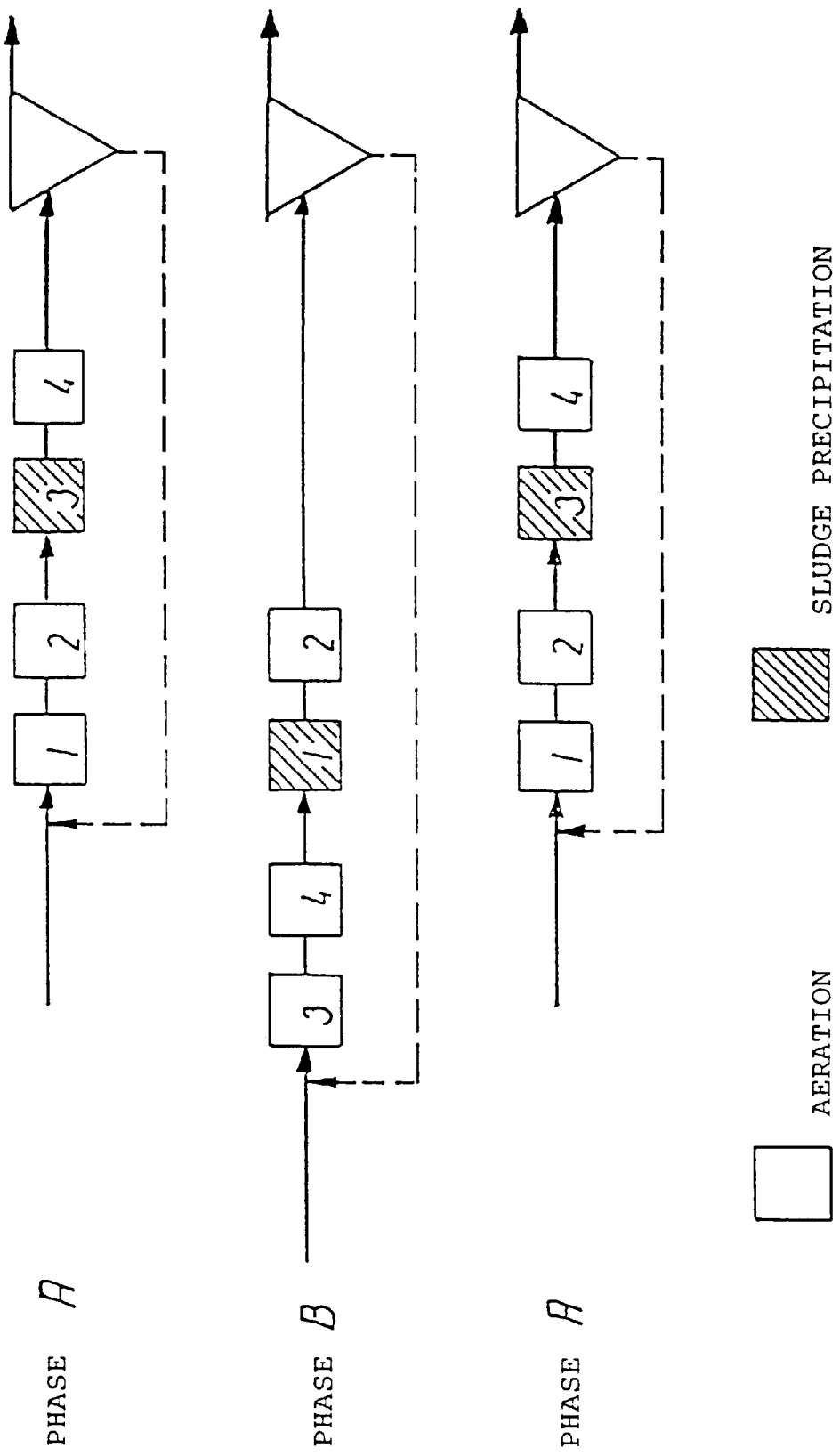
FIG. 3 schematically illustrates a preferred embodiment of the method of the invention using four treatment zones.

The embodiment illustrated in FIG. 3 comprises a first phase A followed by a second phase B which, in turn, is followed by phase A, etc.

In phase A, which may take e.g. 90 minutes, the polluted water is successively passed through the zones 1, 2, 3 and 4 and further to a clarification zone in which it is separated into a water phase and a sludge phase, at least a portion of the latter being recycled and mixed with in-coming polluted water, and wherein said mixture is supplied to zone 1.

During the passage through the zones 1, 2 and 4 said mixture is aerated, and during the passage through zone 3 neither aeration nor stirring is carried out, the result being that sludge is precipitated in said zone. In phase B the mixture of polluted water and recycled sludge is supplied to zone 3 and from that it flows through the zones 4, 1 and 2, while being aerated in zones 3, 4 and 2 and without being subjected to any treatment while flowing through zone 1, thus allowing sludge to precipitate in said zone. This phase may also take e.g. 90 minutes.

Subsequently, a shift to phase A treatment is effected.

As will appear from the above, the flow through the zones 1 and 2 and 3 and 4, respectively, is always in the same sequence whereas the feeding of the mixture of polluted water and recycled sludge to zones 1, 2 and zones 3, 4, respectively, alternates. Thus, it will always be zone 2 or zone 4 which is in direct connection with the clarification zone, and discharge will never take place to the clarification zone from a treatment zone to which untreated polluted water has been supplied directly.

The connection of the treatment zones 1 and 3 with the inlet for untreated polluted water presents the advantage that the sludge concentration is high where the need of purification is the highest.

By using treatment zones with a volume of 8000 $m^3$ and an inlet flow of polluted water of 1000 $m^3$/h and a phase period (A and B) of 90 minutes, a sludge concentration of about 2.6 kg/$m^3$ may be achieved at the outlet from the last treatment zone at a recycling rate of 500 $m^3$ of sludge per hour. At the same time the average sludge concentration in the treatment zones may be increased from about 4 to about 5 kg of sludge per $m^3$.

In the embodiment illustrated in FIG. 3 a removal of BOD is achieved.

Figure 4:
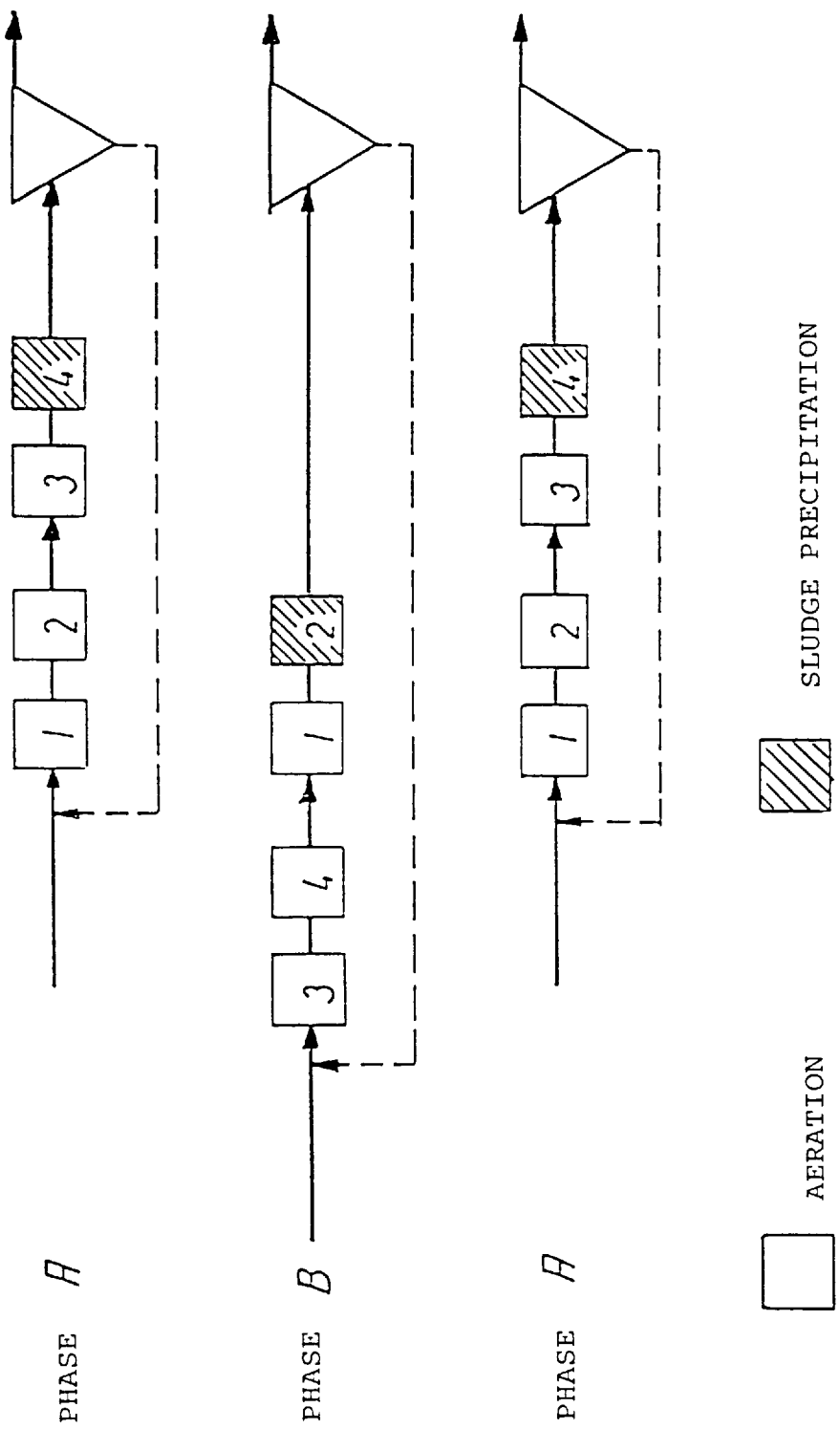
FIG. 4 schematically illustrates a further preferred embodiment of the method of the invention also using four treatment zones.

If a simultaneous denitrification is desired, the embodiment illustrated in FIG. 4 is advantageous.

In said embodiment sludge is precipitated in zone 4 (phase A) and in zone 2 (phase B) and polluted water is alternatingly supplied to zone 1 and zone 3 as described in connection with FIG. 3.

Figure 5:
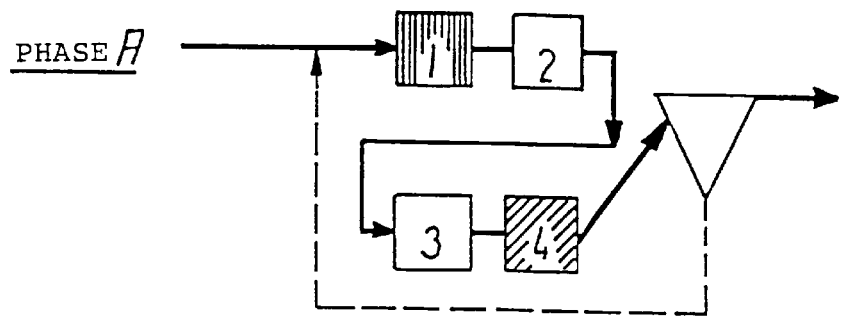
FIG. 5 schematically illustrates an embodiment of the method of the invention in which denitrification is achieved, FIG. 6 schematically illustrates a prior art method for the purification of polluted water in a plant comprising two treatment zones, and FIG. 7 schematically shows the operation of a plant corresponding to the plant shown in FIG. 6, the plant being used for carrying out an embodiment of the method according to the invention.
Figure 5:
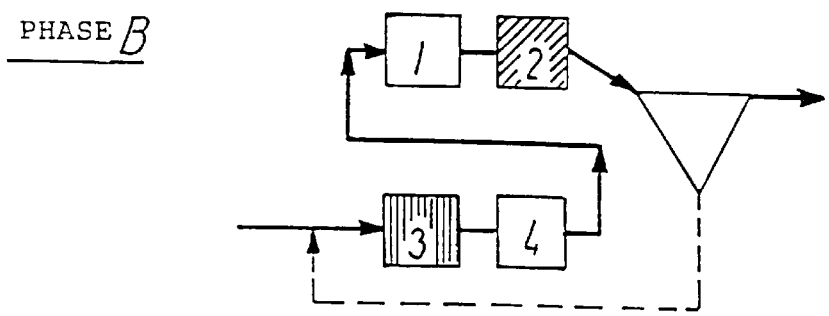
Figure 5:
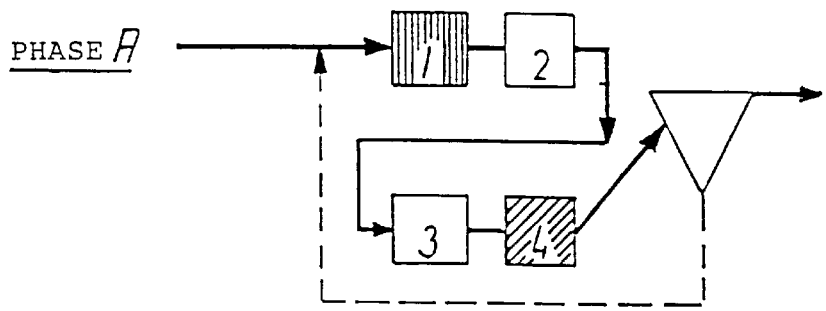
Figure 5:
Figure 5:
Figure 5:

By causing the operational conditions in zone 1 and zone 3 to alternate between aerobic and anoxic conditions as illustrated in FIG. 5 a denitrification as described in GB 1 404 565 is obtained, but under more ideal conditions. Thus, it is known that the denitrification rate is high when the BOD and $NO_3$-N concentrations are high at the same time, which is the case immediately after the inlet for polluted water has been connected with zone 1 or 3. Thereafter, the denitrification rate decreases concurrently with the decrease in the concentration of $NO_3$-N resulting from the denitrification.

In phase A, polluted water containing $NH_3$-N is supplied to zone 1, and in phase B a nitrification will occur in this phase in connection with the aeration of zone 1. The major part of the $NO_3$-N formed in zone 1 will be denitrified in phase A when zone 1 is again connected with the inlet for non-purified polluted water.

This is the known pattern of the method described in GB 1 404 565 and when the total volume to be treated is divided into four parts increased concentrations of N are obtained in zones 1 and 3 and thus an increase of both the nitrification and the denitrification rates.

Of course it is impossible to achieve high nitrification and denitrification rates as a result of high concentrations of N and to simultaneously achieve low concentrations of N as is the aim in the outlet, but the desired low concentrations of $NO_3$-N as well as $NH_3$-N are here achieved in the post-treatment taking place in zone 2 and zone 4. Consequently, it is advantageous always to connect these zones to the clarification zone.

In phase A nitrification of the part of $NH_3$-N which is passed from zone 1 to zone 2 is effected in zone 2, but the major part of $NH_3$-N will be nitrified in zone 1 in phase B (in zone 3 in phase A, respectively).

As described above, denitrification will occur in zone 2 in phase B (zone 4 in phase A, respectively) simultaneously with a retainment of sludge in these zones as a result of precipitation.

To summarize, the illustrated embodiment presents the following advantages:

1) high nitrification and denitrification rates in zone 1 and zone 3,
2) a post-treatment for $NH_3$-N and $NO_3$-N in zone 2 and zone 4, which ensures low outlet concentrations of nitrogen, and
3) an increased amount of sludge in the treatment zones simultaneously with a reduced slugde load on the clarification zone.

Figure 6:
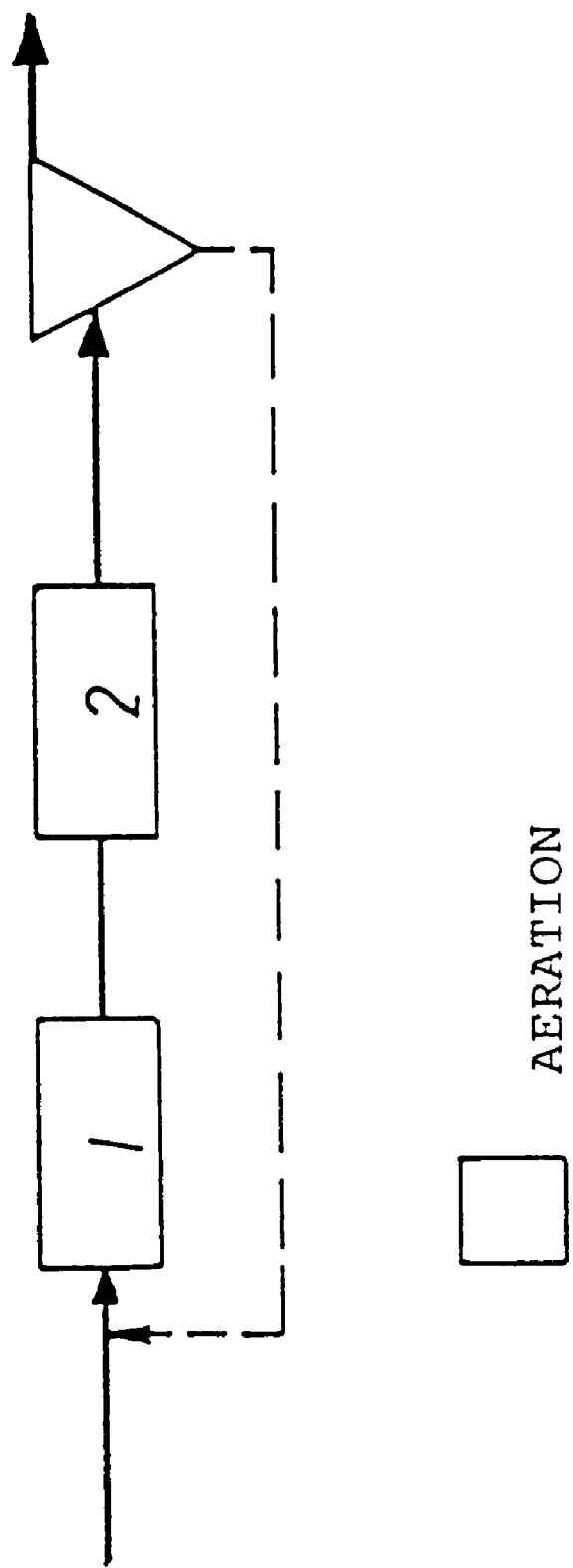

The prior art method illustrated in FIG. 6 for the purification of polluted water may e.g. be dimensioned for the treatment of an amount of water of 1000 $m^3$/h by using a total volume of the treatment zones of 8000 $m^3$, a sludge concentration of 4 $kg/m^3$ and a sludge recycling ratio of 1:1. If the amount of water is increased twofold, i.e. to 2000 $m^3$/h, e.g. as a consequence of temporary heavy showers, the recycling ratio must be increased about twofold. Thus, 2000 $m^3$/h must be recycled, which results in an increase in the sludge load on the clarification zone from about 8000 kg/h to 16,000 kg/h. This is not possible in a normal operation.

Figure 7:
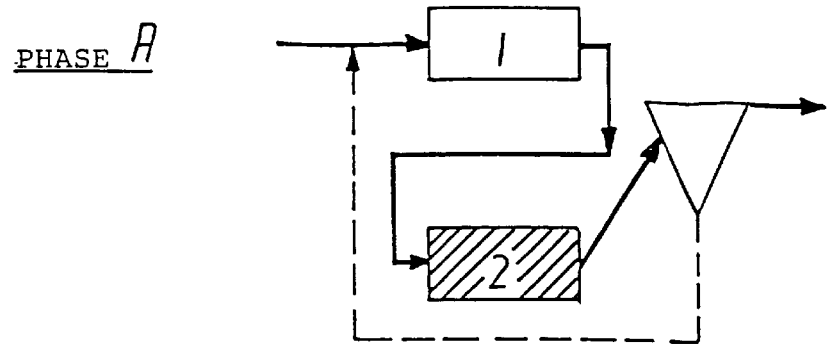
Figure 7:
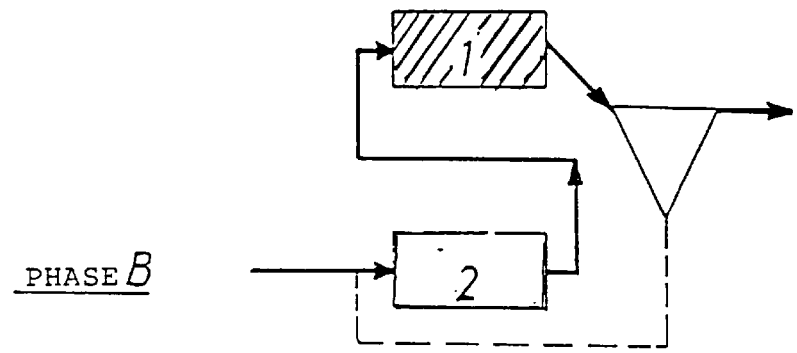
Figure 7:
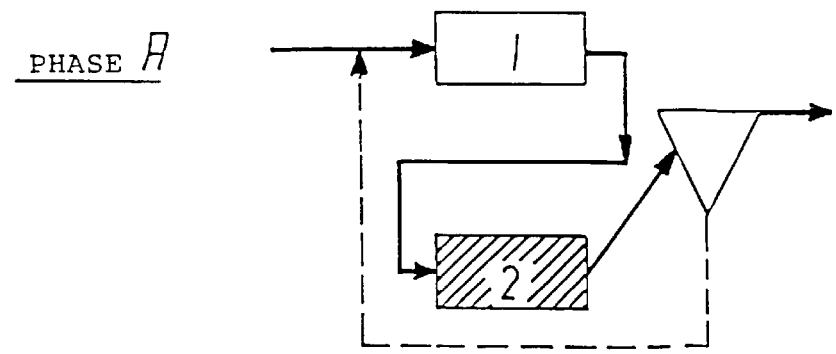

If, however, as illustrated in FIG. 7, the aerators in zone 2 are stopped during the heavy inflow of water (phase A), a sludge precipitation will occur in zone 2, and this will result in a reduction of the sludge load on the clarification zone. Gradually, however, zone 2 will be filled with sludge. If, however, as illustrated by phase B, a phase shift is carried out by passing polluted water to zone 2 and discontinuing the aeration of zone 1, it will be possible to keep the sludge load on the clarification zone at an acceptable level.

Thus, by using the method according to the invention the problems arising from temporary heavy inflows of water may be overcome without passing the polluted water to a recipient in a non-purified state.

We claim:

1. Method for the purification of polluted water, such as waste water, comprising the steps of 1) successively passing a mixture of polluted water and recycled sludge in a predetermined flow direction through at least two biological treatment zones and maintaining within one of said treatment zones such flow conditions that sludge is accumulated therein, 2) periodically changing the flow direction of said mixture by introducing said mixture in the treatment zone in which sludge had been accumulated during the preceding period, 3) passing the water thus treated to a permanent clarification zone to separate the water into a water fraction and a sludge fraction, and 4) recycling at least part of the separated sludge fraction and mixing it with untreated polluted water.

2. Method according to claim 1, wherein at least three of said treatment zones are used.

3. Method according to claim 2, comprising the further step of aerating two of said zones while a third of said zones serves as a sludge precipitation zones.

4. Method according to claim 1, wherein four of said treatment zones are used.

5. Method according to claim 4, wherein the mixture of polluted water and recycled sludge is passed through the four zones in series and wherein the mixture is alternatingly suppled to a first and a third of said zones.

6. Method according to claim 1, wherein, a duration of a period of treatment or of a period of sludge precipitation is controlled by the concentration of ammonia or a corresponding parameter in the aerobic treatment zone so that the period ends when the desired conversion of ammonia has been accomplished.

7. Method according to claim 1, wherein, the duration of the treatment period and of the sludge precipitation period is between 30 and 180 minutes, preferably between 45 and 120 minutes.

8. Method according to claim 1, wherein 10–50% of the volume of the treatment zones are utilized for sludge precipitation.

9. Plant for the purification of polluted water, such as waste water, comprising at least two treatment tanks provided with aeration and/or stirring means and means for alternatingly feeding a mixture of polluted water and recycled sludge to one tank and the other tank, means for alternatingly discharging aqueous medium from the treatment tanks, a clarification tank provided with means for supplying aqueous medium from the treatment tanks, means for discharging purified water and means for discharging precipitated sludge and recycling the discharged sludge to one of treatment tanks, wherein means for intermittently stopping the aeration or stirring means in each said treatment tank is provided to effect precipitation of sludge, and means for shifting the feeding of the mixture of polluted water and sludge is provided such that the tank which during the previous period served as a sludge precipitation tank is suppled with the mixture of polluted water and sludge before the mixture is passed on to one or more treatment of the tanks.

* * * * *